United States Patent

[11] 3,593,377

[72] Inventor Bryant Edwards
  Clarendon Hills, Ill.
[21] Appl. No. 875,881
[22] Filed Nov. 12, 1969
[45] Patented July 20, 1971
[73] Assignee Illinois Tool Works, Inc.
  Chicago, Ill.

[54] CONTAINER REMOVAL APPARATUS
  5 Claims, 2 Drawing Figs.
[52] U.S. Cl. .................................................. 18/20 RR,
  18/19 F, 18/2 RA
[51] Int. Cl. ................................................. B29c 17/00
[50] Field of Search............................................ 18/19 F, 19
  R, 19 P, 20 C, 20 R, 20 RR, 21, 4 S, 2 RA, 5, DIG.
  24, DIG. 48

[56] References Cited
UNITED STATES PATENTS

| | | | |
|---|---|---|---|
| 2,027,915 | 1/1936 | Kux............................ | 18/20 R |
| 2,744,286 | 5/1956 | Carpenter et al............. | 18/2 RA X |
| 2,745,135 | 5/1956 | Gora............................ | 18/5 D X |
| 2,915,784 | 12/1959 | Gora............................ | 18/20 R |
| 3,069,725 | 12/1962 | Root............................ | 18/20 RR X |
| 3,091,808 | 6/1963 | Dakin.......................... | 18/19 F |
| 3,105,270 | 10/1963 | Fibish.......................... | 18/19 R |
| 3,218,379 | 11/1965 | Edwards....................... | 18/19 F X |
| 3,234,594 | 2/1966 | Winstead...................... | 18/4 S |
| 3,235,639 | 2/1966 | Knowles....................... | 18/19 F X |
| 3,240,851 | 3/1966 | Scalora......................... | 18/19 F X |
| 3,418,691 | 12/1968 | Hanai........................... | 18/20 RR |
| 3,541,641 | 11/1970 | Hashimoto................... | 18/2 RA X |

*Primary Examiner*—J. Howard Flint, Jr.
*Attorneys*—Robert W. Beart, Michael Kovac, Barry L. Clark and Jack R. Halvorsen ABSTRACT: In a continuous-motion container-molding machine including a plurality of continuously rotating male and female mold elements which form disposable plastic containers from a heated web of thermoplastic material, there is provided a hollow container ejector tube which is configured and designed relative to the female mold elements to permit the rapid entry of containers from the female mold elements and transfer of the containers to a collecting station.

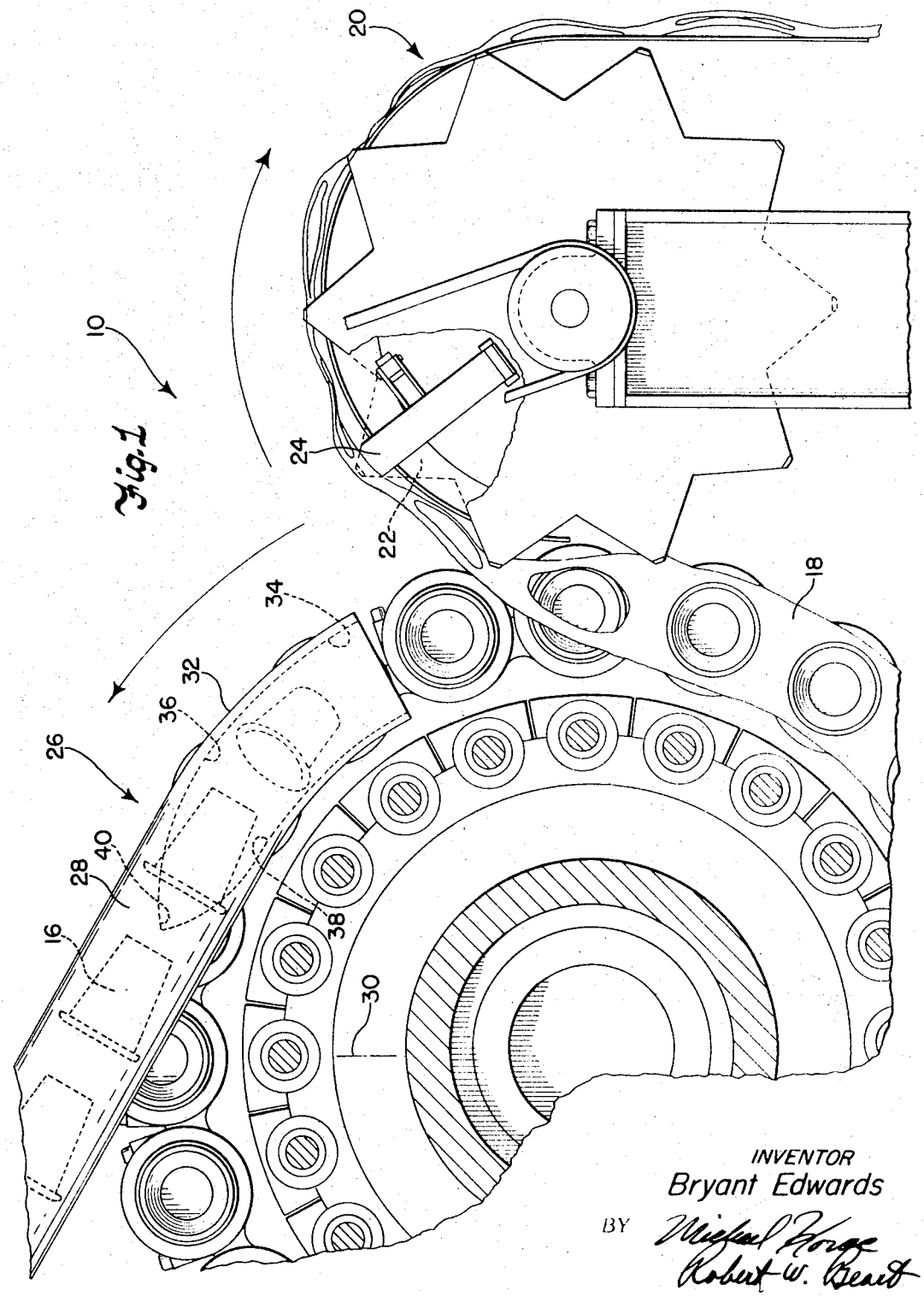

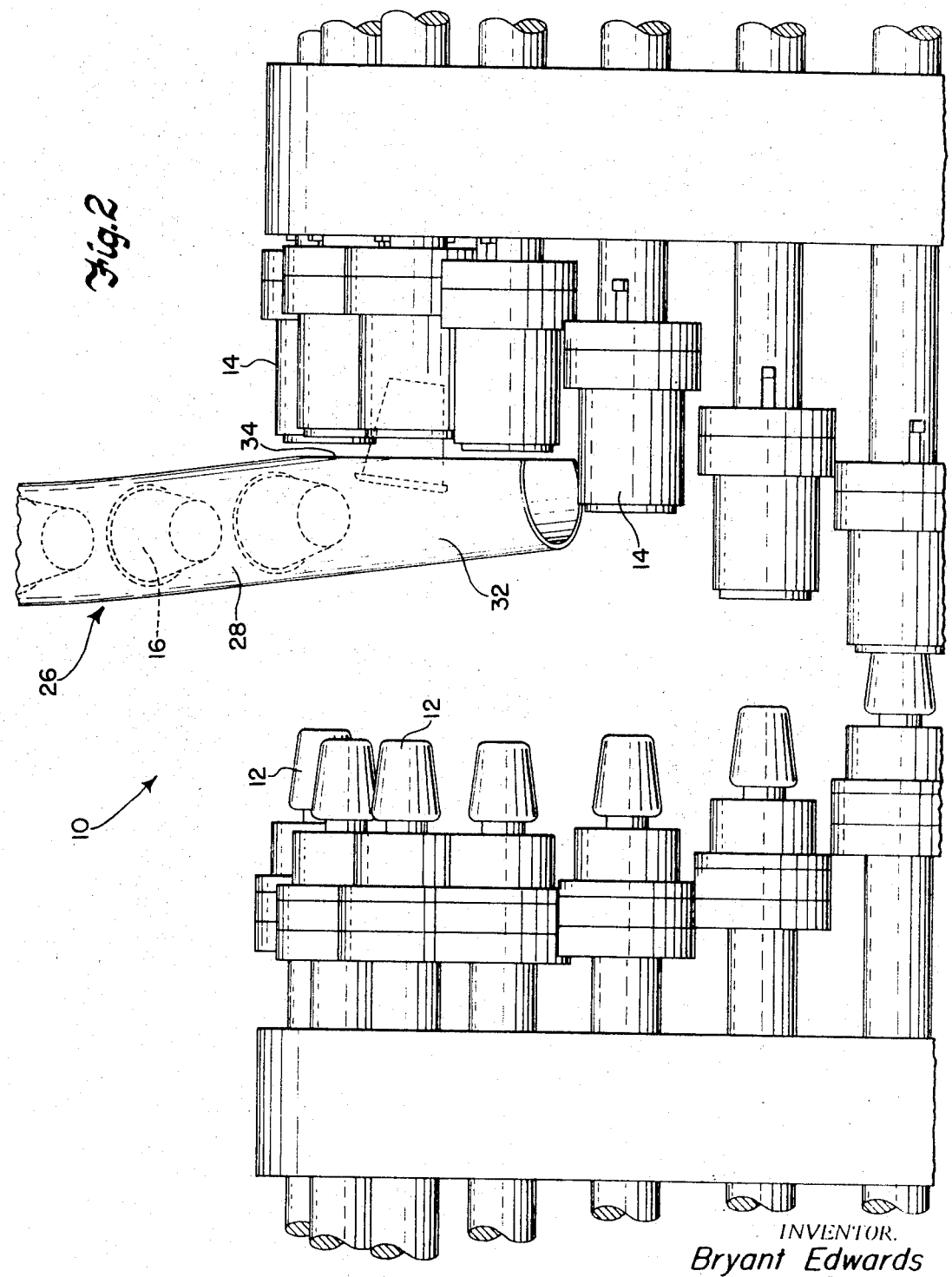

CONTAINER REMOVAL APPARATUS

This application is a companion to copending patent application Ser. No. 845,270, filed July 28, 1969, in the name of the instant applicant, which companion application is assigned to the same assignee as the present application. The aforementioned companion application discloses the basic technique for causing a moving web of heated plastic material traveling in a linear path to be clamped to a rotary molding station at which cooperating molds operate upon the heated web to form disposable plastic containers. The present invention is directed to the manner in which containers can be rapidly removed from the molds of the rotary molding station and transferred to a collecting station.

The general operation of the continuous-molding machine or method disclosed and claimed in the aforementioned companion application includes the steps or means for feeding a heated thermoplastic web to at least one pair of continuously rotating cooperating molds, simultaneously attaching the web to the molds for predetermined, coincidental movement therewith and clamping off a predetermined material area from the remainder of the web, and then forming containers from the predetermined material area when attached to the cooperating molds.

The speed at which the continuous-molding machine in the aforementioned companion application operates makes it very necessary to provide an apparatus which quickly removes the containers formed by the machine. Thus, the proper functioning of the machine, from an overall container-processing standpoint, is greatly enhanced by means which effectuate rapid container removal.

It is an object of the present invention to provide a container removal means for a continuous-motion container-molding machine.

Another object of the present invention is to provide a container removal means, in the form of a hollow container ejector tube, which facilitates rapid entry of containers therein and subsequent rapid propulsion to a container collection station.

These and other objects and advantages of the present invention are attained by providing, in a continuous-motion container-molding machine having a plurality of continuously rotating cooperating male and female mold elements which form disposable plastic containers from a heated web of thermoplastic material, the improvement which comprises a hollow container ejector tube having a curvilinear lower end which is complementary to a predetermined arcuate portion of the machine containing at least one of the female mold elements, the curvilinear lower end being provided with a longitudinally extending opening which is positioned adjacent the female mold elements to facilitate entry of containers ejected from the female mold elements, and means establishing a vacuum within the hollow container ejector tube to assist in the lifting and propelling of the containers to a collecting station.

Reference is now made to the drawings wherein:

FIG. 1 is a fragmentary side elevational view of one-half of a container molding station, as specifically illustrated in the aforementioned companion application, and depicting the manner in which the container-removal means is constructed in accordance with the teachings of the present invention; and FIG. 2 is a fragmentary side elevational view illustrating the relative positionment of the container-removal means of the present invention relative to the female mold elements of the container-molding station.

In order to highlight the features which are characteristic of the present invention, the discussion that is to follow has been limited to the container removal means as it removes containers from a continuous-molding machine of the type disclosed and claimed in the aforementioned companion application.

Referring to FIGS. 1—2 of the drawings, there will be seen a container-molding machine 10 which includes, inter alia, a plurality of cooperating pairs of continuously rotating male and female mold elements 12, 14 which are mounted in opposition to one another. The male and female mold elements are reciprocating toward and away from one another during rotation thereof to form containers 16. The technique for forming thin-wall, disposable plastic containers from a heated web of thermoplastic material is commonly known as thermoforming. This technique includes the use of male elements which act to prestretch the heated web of material for disposition within the female mold elements whereupon a differential of pressure is created between the prestretched article and the remainder of the web to further expand the article to its ultimate container shape. Thereafter, the containers may be removed from the female molds either attached to or separated from the scrap material, depending upon the thermoforming operation that is desired.

In the present invention, the thermoforming method includes the severance of the containers 16 from the remainder of the web 18 illustrated in FIG. 2 by the use of cooperating cutting sections (not shown) provided on the male and female elements. One way of accomplishing the severance of the containers from the remainder of the web is disclosed and claimed in U.S. Pat. No. 2,891,280. The present invention is only concerned with the manner in which the containers 16 are removed from the female mold elements 14 of the machine 10, once separated or severed from the web 18, the latter being removed from the machine 10 by the scrap pickoff mechanism 20 which includes fixed and moving gripper plates 22, 24 which grip the scrap material 18 and remove it from the machine 10. For a further discussion of the structure and operation of the scrap pickoff mechanism 20, reference is hereby made to the aforementioned companion application.

In accordance with the teachings of the present invention, a cup removal means 26 is provided which is arranged to aid in the removal of the containers 16 from the female mold elements 14 for conveyance to a collecting station (not shown). Preferably, the female mold elements 14 include container ejector plugs or the like which initially disengage the containers 16 from the female molds 14 for removal by the container removal means 26. The collecting station to which the remote end of the container removal means 26 is connected may comprise either a cup-stacking device or an apparatus for rolling or curling the rims of the containers 16. Thus, it should be apparent that the cup removal means 26, in a continuous molding machine 10, avoids the necessity of orienting containers when formed since they may be conveyed in a predetermined attitude to the collecting station (not shown), as will now be explained.

The container removal means 26 comprises a generally cylindrically shaped hollow container ejector tube 28 which extends upwardly and outwardly away from the female mold elements 14 at a position which is approximately 310° from the top dead center identified at 30 of the machine. The container ejector tube 28 includes a lower, curved section 32 which generally follows the circular female mold placement for at least one, and preferably two female mold elements 14. On the side of the tube 28 which is adjacent the female mold elements 14, the curvilinear section 32 is provided with a longitudinally extending opening 34 which intersects the curvilinear, lower section 32 of the cylindrically shaped container ejector tube 28 at an angle relative to the axis thereof, as best illustrated in FIG. 2 of the drawings to enable the container ejector tube 26 to be mounted as close as possible to the female mold elements 14. This arrangement permits containers 16 to be rapidly deposited, without falling, into the longitudinally extending opening 34 of the container ejector tube 28 when the containers are ejected from the female mold elements 14. In order to facilitate rapid removal of the containers 16 by way of the container ejector tube 26, a vacuum or negative air pressure is established within the container ejector tube 26 by means which are connected to a suitable air source (not shown). The vacuum will assist in the lifting and propelling of the containers 16 to a collecting station (not shown) which may include container-stacking or rim-rolling apparatus, as may be desired.

It should be noted that the longitudinal opening 34, on opposite marginal portions 36, 38 thereof, gradually tapers upwardly and inwardly to an apically configured portion 40 which, together with the tapering marginal portions 36, 38, provides a restrictive aperture which prevents accidental displacement or removal of the containers, when deposited in the container ejector tube 28.

From the foregoing, it will now be appreciated that the present invention contemplates a very simple container removal means which functions in a highly effective manner to rapidly remove and convey containers from a continuous-molding machine to a collecting station.

Although a specific embodiment of the present invention has been disclosed and described, it is with full awareness that many modifications thereof are possible. The invention, therefore, is not to be restricted except in so far as is necessitated by the prior art and the scope of the appended claims.

I claim:

1. In a continuous-motion container-molding machine including a plurality of continuously rotating cooperating male and female mold elements which form disposable plastic containers from a heated web of thermoplastic material, the improvement comprising a hollow container ejector tube having a curvilinear lower end which is complementary to a predetermined arcuate portion of the machine containing at least one of the female mold elements, the curvilinear lower end being provided with a longitudinally extending opening which is positioned adjacent the female mold elements to facilitate entry of containers ejected from the female mold elements, and means establishing a vacuum within the hollow container ejector tube to assist in the lifting and propelling of the containers to a collecting station.

2. The apparatus as defined in claim 1 wherein said hollow container ejector tube extends upwardly away from the continuous-motion molding machine at a position which is approximately 310° offset from the top dead center of the machine.

3. The apparatus as defined in claim 1 wherein the longitudinally extending opening traverses at least two female mold elements.

4. The apparatus as defined in claim 1 wherein said hollow container ejector tube is cylindrical and said longitudinally extending opening intersects the hollow container ejector tube at an angle which permits the marginal portions surrounding the opening to extend substantially normal to the reciprocating movement of the female mold elements.

5. The apparatus as defined in claim 1 wherein marginal portions on opposite sides of the longitudinally extending opening gradually taper towards the upper end to an apically configured portion.